United States Patent
Chiang

[11] Patent Number: 6,119,470
[45] Date of Patent: Sep. 19, 2000

[54] FREEZING TANK

[76] Inventor: Hank Chiang, No. 162, Chung-Chen S. Rd., Hsia-Jen, Hsiang, Tainan Hsien, Taiwan

[21] Appl. No.: 08/903,717

[22] Filed: Jul. 31, 1997

[51] Int. Cl.[7] .................................................... F25B 49/00
[52] U.S. Cl. ............................................. 62/129; 73/49.3
[58] Field of Search ......................... 62/125, 129, 457.2; 73/49.2 T, 49.3, 49.2 R

[56] References Cited

U.S. PATENT DOCUMENTS

| | | | |
|---|---|---|---|
| 3,280,586 | 10/1966 | Funakoshi | 62/457.2 |
| 4,442,702 | 4/1984 | Sawada | 73/49.2 T |
| 4,791,814 | 12/1988 | Nee | 73/49.2 T |
| 5,081,864 | 1/1992 | Zaim | 73/49.2 T |
| 5,184,504 | 2/1993 | Spring | 73/49.2 T |
| 5,375,455 | 12/1994 | Maresca, Jr. et al. | 73/49.2 T |
| 5,507,176 | 4/1996 | Kammeraad et al. | 73/49.2 T |

*Primary Examiner*—William E. Tapoical

[57] ABSTRACT

A freezing tank for making ice cream includes an outer tank that has a first enclosing tank wall with a first open end, and an inner tank that is placed in the outer tank through the first open end and that has a second open end surrounded by the first open end. The inner tank has a second enclosing tank wall received in the first enclosing tank wall. The first and second enclosing tank walls confine a cooling chamber for receiving a freezing fluid therein. The second open end is jointed to the first open end in a fluid-tight relationship to prevent leakage of the freezing fluid. Pressurized fluid can enter into the cooling chamber via a first hole that is communicated with the cooling chamber and that allows for insertion of a pressurizing device. A pressure detecting device can be mounted to the first enclosing tank wall to detect a decreased pressure representative of existence of a leakage via a second hole formed in the first enclosing tank wall. Closure members are provided for closing sealingly and selectively the first and second holes.

3 Claims, 3 Drawing Sheets

FREEZING TANK

BACKGROUND OF THE INVENTION

1. Field of the Invention

The present invention relates to a freezing tank for making ice cream, more particularly to a freezing tank which permits convenient and precise detection of a leakage so as to ensure a leak-proofing effect thereof.

2. Description of the Related Art

Referring to FIG. 1, a conventional freezing tank 10 for making ice cream is shown to include an outer tank 11 which has a first open end 111, and an inner tank 13 which is placed in the outer tank 11 to confine a cooling chamber 14 with the outer tank 11 for receiving a freezing fluid 12 and which has a second open end 131 jointed to the first open end 111 in a fluid-tight relationship to prevent leakage of the freezing fluid 12.

After a sealing process for sealing the first open end 111 of the outer tank 11 to the second open end 131 of the inner tank 13, the resulting freezing tank 10 must be subjected to a quality control process for detection of a leakage of the freezing fluid 12. Conventionally, the detection is conducted by placing the freezing tank 10 in water and inspecting if bubbles are generated at the juncture of the first and second open ends 111, 131. Generation of bubbles indicates the presence of a leakage at the juncture. However, since the cooling chamber 14 is filled with the freezing fluid 12, and since there is no significant pressure difference between an interior and an exterior of the cooling chamber 14, bubbles are not easily detected when the leakage is relatively small. Thus, the operator may not be able to successfully detect the presence of a defective freezing tank 10. Leakage or vaporization of the freezing fluid 12 from the cooling chamber 14 of the defective freezing tank 10 can result in a reduced freezing effect and in harm to the user's health.

SUMMARY OF THE INVENTION

The main object of the present invention is to provide a freezing tank whose quality can be well controlled so as to ensure the user's safety.

Accordingly, the freezing tank of the present invention is for making ice cream by use of a freezing fluid and is capable of ensuring a leakage-proofing effect for the freezing fluid received therein via introduction of a pressurized fluid through a pressurizing device and via detection of a decrease in pressure of the pressurized fluid through a pressure detecting device. The freezing tank includes an outer tank and an inner tank. The outer tank has a first enclosing tank wall with a first open end. The inner tank is placed in the outer tank through the first open end, and has a second open end surrounded by the first open end. The inner tank has a second enclosing tank wall received in the first enclosing tank wall. The first and second enclosing tank walls confine a cooling chamber adapted for receiving the freezing fluid. The second open end is jointed to the first open end in a fluid-tight relationship to prevent leakage of the freezing fluid. The pressurized fluid is permitted to enter into the cooling chamber by means of a first hole that is communicated with the cooling chamber and that is adapted for insertion of the pressurizing device. A first closure member closes sealingly and selectively the first hole. A second hole is formed in the first enclosing tank wall and is adapted for extension of the pressure detecting device into the cooling chamber, thereby permitting detection of a decreased pressure representative of existence of a leakage. A second closure member closes sealingly and selectively the second hole.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
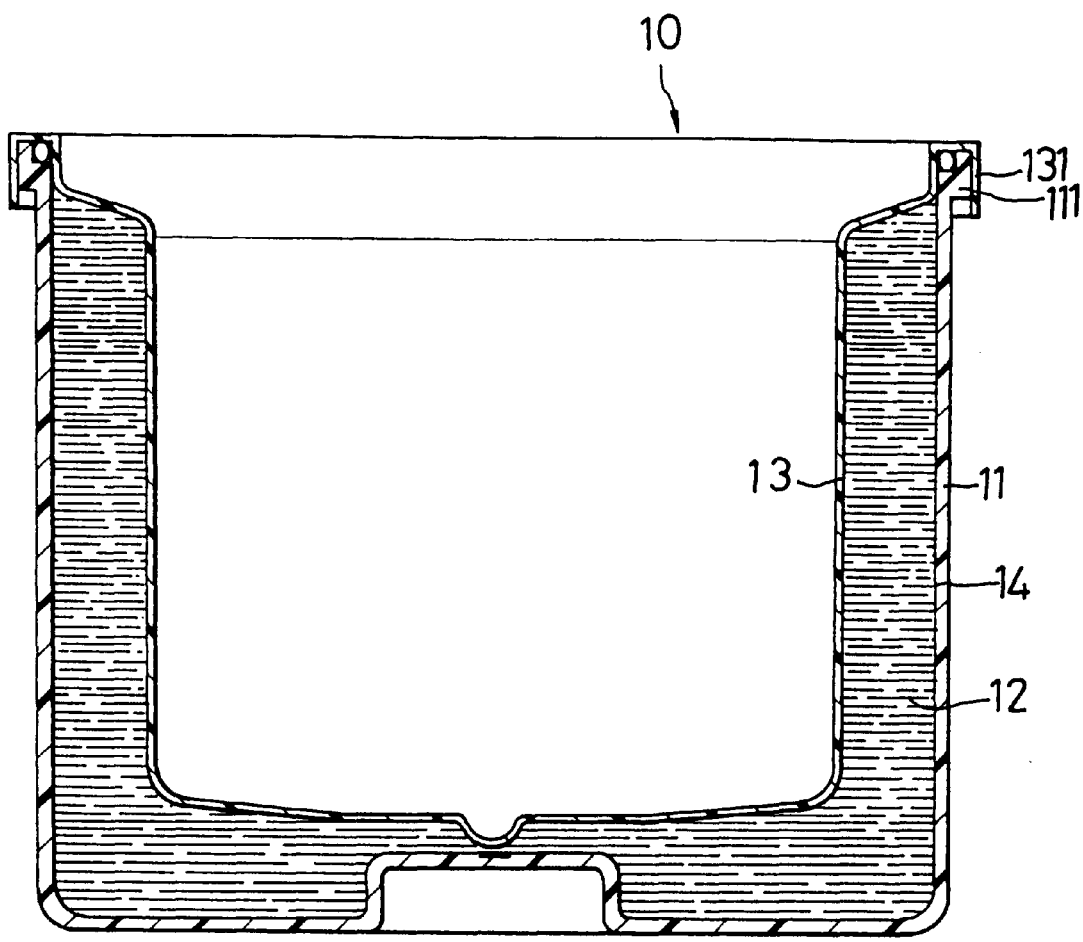
FIG. 1 is a vertical sectional view of a conventional freezing tank for making ice cream.
Figure 2:
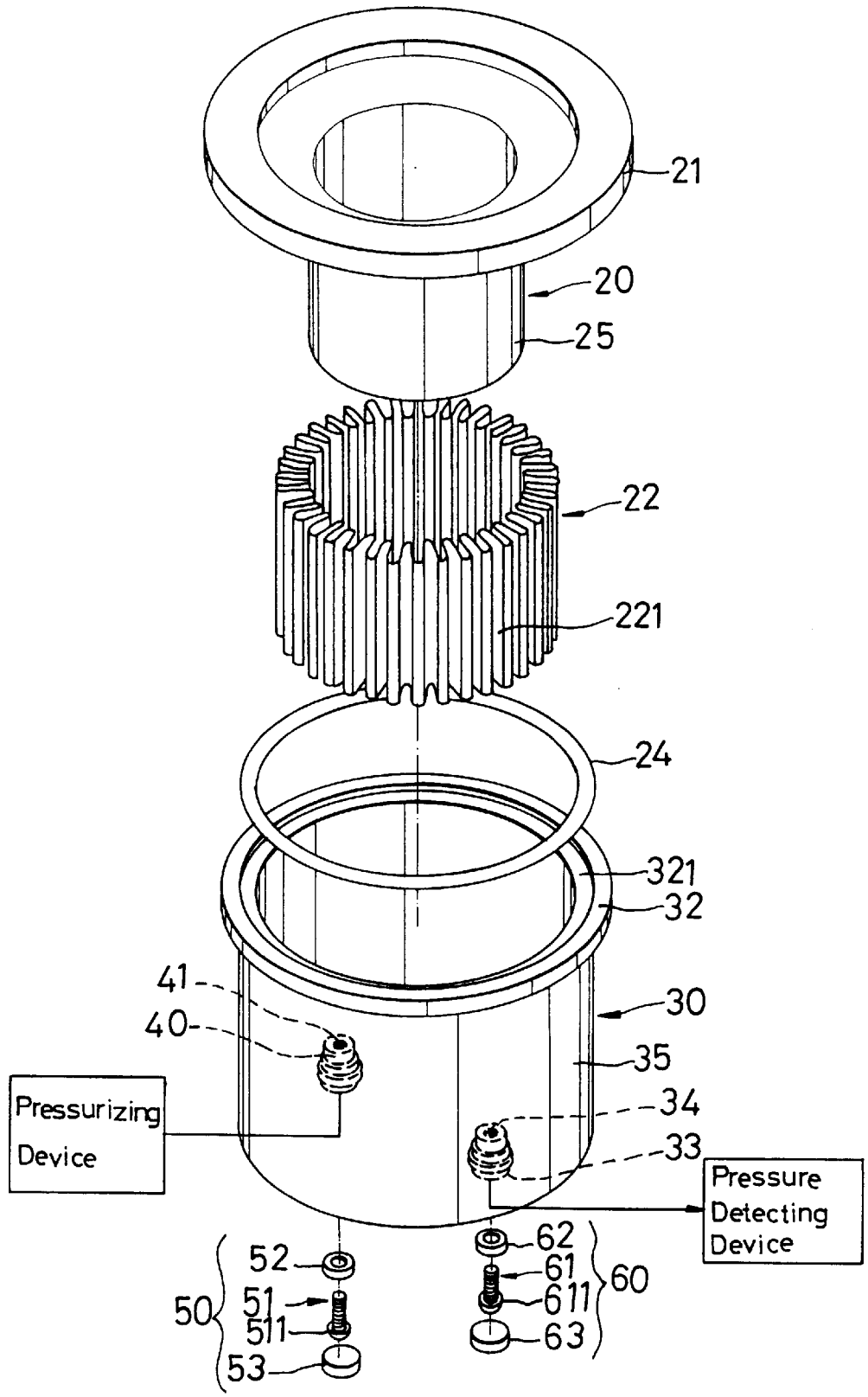
FIG. 2 is an exploded perspective view of a freezing tank according to a preferred embodiment of the present invention.
Figure 3:
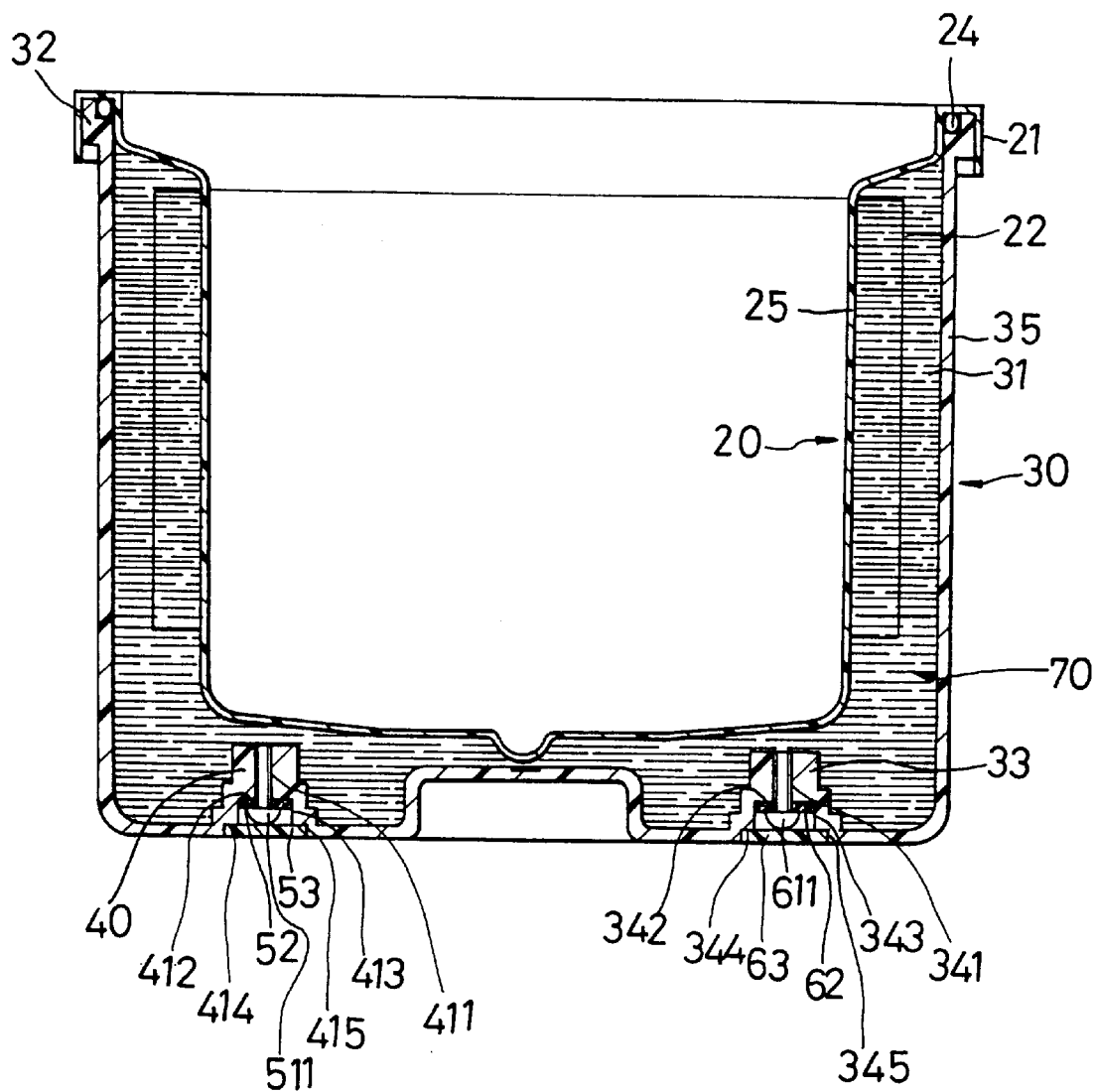
FIG. 3 is a vertical sectional view of the freezing tank of the preferred embodiment.

Referring to FIGS. 2 and 3, the freezing tank according to the preferred embodiment of the present invention is shown to include an outer tank 30, an inner tank 20 and an annular fin assembly 22.

The outer tank 30 has a first enclosing tank wall 35 with an upper rim portion that has a recess 321 for receiving a sealing ring 24 and that confines a first open end 32.

The inner tank 20 is placed in the outer tank 30 through the first open end 32, and has a second enclosing tank wall 25 received in the first enclosing tank wall 35. The second enclosing tank wall 25 has an upper rim portion that confines a second open end 21 which is surrounded by the first open end 32 of the outer tank 30. The first and second enclosing tank walls 35, 25 confine a cooling chamber 31 which is adapted for receiving a freezing fluid 70 therein. The second open end 21 is jointed to the first open end 32 of the outer tank 30 in a fluid-tight relationship to prevent leakage of the freezing fluid 70. As shown, the second enclosing tank wall 25 has the annular fin assembly 22 disposed around a surrounding wall portion thereof in such a manner that the annular fin assembly 22 has a plurality of fins 221 extending from the second enclosing tank wall 25 and into the cooling chamber 31 to help dissipate heat from an interior of the inner tank 20.

The outer tank 30 is provided with a tubular nozzle attachment body 40 which projects inwardly and integrally from a bottom portion of the first enclosing tank wall 35 and which confines a first hole 41 that is communicated with the cooling chamber 31. The first hole 41 is adapted for insertion of a pressurizing device for introduction of a pressurized fluid, such as pressurized gas, into the cooling chamber 31. The freezing tank further includes a first closure member 50 for closing sealingly and selectively the first hole 41.

The outer tank 30 is further provided with a tubular mounting member 33 which projects inwardly and integrally from the bottom portion of the first enclosing tank wall 35 and which confines a second hole 34 that is communicated with the cooling chamber 31. The second hole 34 is adapted for extension of a pressure detecting device into the cooling chamber 31 for detection of a decrease in pressure of the pressurized fluid. The freezing tank further includes a second closure member 60 for closing sealingly and selectively the second hole 34.

Each of the first and second holes 41, 34 is formed as a stepped hole which has an innermost threaded hole portion 411, 341 with a smallest cross-section, an intermediate hole portion 413, 343 with a cross-section greater than that of the smallest cross-section, an outermost hole portion 415, 345 with a largest cross-section, a first shoulder 412, 342 between the innermost and intermediate hole portions 411, 341, 413, 343, and a second shoulder 414, 344 between the intermediate and outermost hole portions 413, 343, 415, 345.

Each of the first and second closure members 50, 60 has a screw member 51, 61 which is threadedly inserted into the innermost hole portion 411, 341 and which has a head 511, 611 received in the intermediate hole portion 413, 343, a resilient annular first sealing member 52, 62 clamped by the head 511, 611 and the first shoulder 412, 342, and a second sealing member 53, 63 press-fitted in the outermost hole portion 415, 345 against the second shoulder 414, 344.

To assemble the freezing tank of the present embodiment, the inner tank 20 with the annular fin assembly 22 sleeved therearound is disposed within the outer tank 30 to press tightly the sealing ring 24 between the first and second open ends 32, 21. The first open end 32 of the outer tank 30 is then jointed to the second open end 21 of the inner tank 20 via a sealing process, thereby confining the cooling chamber 31 between the inner and outer tanks 20, 30.

After sealing, the freezing tank is subjected to the following quality control process to detect the existence of a leakage at the juncture of the first and second open ends 32, 21. A pressure detecting device is inserted into the second hole 34 of the mounting member 33. A nozzle of a pressurizing device is then attached to the nozzle attachment body 40 so as to introduce pressurized gas into the cooling chamber 31 via the first hole 41. The pressure of the pressurized gas within the cooling chamber 31 is detected with the use of the pressure detecting device. If there is a leakage at the juncture of the first and second enclosing tank walls 35, 25, the pressurized gas will escape from the leakage, thereby resulting in a decrease in pressure as compared to the predetermined introduced pressure. As such, the defective freezing tank can be detected in a precise manner.

After the quality control process, the acceptable freezing tank is filled with the freezing fluid 70 via any of the first and second holes 41, 34 to fill the cooling chamber 31. Subsequently, the first and second closure members 50, 60 are mounted to the first and second holes 41, 34 for closing sealingly the first and second holes 41, 34.

Accordingly, the freezing tank of the present invention can permit convenient and precise detection of a leakage. The leak-proofing effect of the freezing tank can thus be ensured.

With this invention thus explained, it is apparent that numerous modifications and variations can be made without departing from the scope and spirit of this invention. It is therefore intended that this invention be limited only as indicated in the appended claims.

I claim:

1. A freezing tank for making ice cream by use of a freezing fluid, the freezing tank being capable of ensuring a leakage-proofing effect for the freezing fluid received therein via introduction of a pressurized fluid through a pressurizing device and via detection of a decrease in pressure of the pressurized fluid with a pressure detecting device, the freezing tank comprising:

an outer tank having a first enclosing tank wall with a first open end;

an inner tank placed in the outer tank through the first open end and having a second open end surrounded by the first open end, the inner tank having a second enclosing tank wall received in the first enclosing tank wall, the first and second enclosing tank walls confining a cooling chamber for receiving the freezing fluid therein, the second open end being jointed to the first open end in a fluid-tight relationship to prevent leakage of the freezing fluid;

fluid entry means for permitting the pressurized fluid to enter the cooling chamber, the fluid entry means including a nozzle attachment body which projects inwardly and integrally from the first enclosing tank wall and which has a first hole communicating with the cooling chamber and adapted for insertion of the pressurizing device, and a first closure member for closing sealingly and selectively the first hole; and mounting means for mounting the pressure detecting device to the first enclosing tank wall to detect a decreased pressure representative of existence of a leakage, the mounting means including a mounting member which projects inwardly and integrally from the first enclosing tank wall and which has a second hole adapted for extension of the pressure detecting device into the cooling chamber, and a second closure member for closing sealingly and selectively the second hole, each of the first and second holes being a stepped hole which has an innermost threaded hole portion with a smallest cross-section, an intermediate hole portion with a cross-section greater than that of the smallest cross-section, an outermost hole portion with a largest cross-section, a first shoulder between the innermost and intermediate hole portions, and a second shoulder between the intermediate and outermost hole portions.

2. The freezing tank according to claim 1 wherein each of the first and second closure members has a screw member which is inserted threadedly into the innermost hole portion and which has a head received in the intermediate hole portion, a first sealing member clamped by the head and the first shoulder, and a second sealing member press-fitted in the outermost hole portion against the second shoulder.

3. The freezing tank according to claim 1 further comprising a plurality of fins extending from the second enclosing tank wall into the cooling chamber.

\* \* \* \* \*